United States Patent [19]

Gebauer et al.

[11] Patent Number: 4,769,699
[45] Date of Patent: Sep. 6, 1988

[54] CONTROL CIRCUIT FOR A VIDEO CAMERA AND METHOD FOR CONTROLLING A VIDEO CAMERA

[75] Inventors: Volker M. Gebauer, Olching; Joachim Wietzke, Ober-Ramstadt-Hahn, both of Fed. Rep. of Germany

[73] Assignee: Arnold + Richter, Cine Technik GmbH & Co. Bertriebs KG, Munich, Fed. Rep. of Germany

[21] Appl. No.: 727,253

[22] Filed: Apr. 25, 1985

[30] Foreign Application Priority Data

Apr. 25, 1984 [DE] Fed. Rep. of Germany ....... 3415414
Oct. 10, 1984 [DE] Fed. Rep. of Germany ....... 3437208
Oct. 10, 1984 [DE] Fed. Rep. of Germany ....... 3437210

[51] Int. Cl.$^4$ .................... H04N 7/18; H04N 3/36
[52] U.S. Cl. .......................... 358/97; 358/93; 358/214; 354/75
[58] Field of Search ............... 358/97, 93, 209, 223, 358/214, 98; 354/75

[56] References Cited

U.S. PATENT DOCUMENTS 2,982,171  5/1961  Debrie ................... 358/97
3,546,378 12/1970  Karikawa ............... 354/75
4,346,408  8/1982  Massmann ............... 358/214
4,475,539 10/1984  Konomura .............. 358/98
4,594,608  6/1986  Hatae et al. .............. 358/93
4,622,584 11/1986  Nagasaki et al. ......... 358/98

FOREIGN PATENT DOCUMENTS 0087296  8/1983  European Pat. Off. .
0104407  4/1984  European Pat. Off. .
2486337  8/1982  France .
1139580  1/1969  United Kingdom .

Primary Examiner—James J. Groody
Assistant Examiner—John K. Peng
Attorney, Agent, or Firm—Toren, McGeady & Associates

[57] ABSTRACT

A control circuit for a video camera by which a charge image of an object to be recorded is adapted to be produced, the image being at least partly erased when being read-out for generating a video output signal. In order to avoid an image flicker of a video image produced by the video output signal when light supplied to the video camera is periodically interrputed, a reading-out of the charge image of the video camera is periodically prevented, at least during the period in which there is a light supply from the object to be recorded to the video camera.

13 Claims, 4 Drawing Sheets

CONTROL CIRCUIT FOR A VIDEO CAMERA AND METHOD FOR CONTROLLING A VIDEO CAMERA

BACKGROUND OF THE INVENTION

1. Field of the Invention

This invention relates to a control circuit for a video camera by means of which a charge image of an object to be recorded is adapted to be produced, this image being at least partly erased when being read out for a generating a video output signal of the video camera. Moreover, this invention relates to a method for controlling a video camera, comprising the method steps of producing a charge image of an object to be recorded and of producing a video output signal by reading out the charge image which at least partly erases the charge image.

2. Description of Related Art

Video cameras having control circuits which periodically produce a charge image of an object to be recorded by means of an image converter, which may be designed as a vidicon tube, have been known for quite a long time. In such a known video camera, the charge image of the vidicon tube is periodically scanned for generating a video output signal. During such a scanning of the charge image of the vidicon tube, the charge image is at least partly erased. In the known video camera, the scanning of the charge image for generating the video output signal is controlled by means of vertical and horizontal synchronization signals which effect a reading out of the charge image in synchronization with vertical synchronization pulses and horizontal synchronization pulses, the time distance between two subsequent synchronization pulses determining the read-out repetition rate for the charge image depending on the television standard according to which said video camera operates.

Such a known video camera comprising a control circuit operates in an extremely satisfactory manner when light is continuously supplied from the object to be recorded to the video camera.

If, however, the known video camera for recording an object is used with a periodically varying or periodically interrupted light supply from the object to be recorded to the video camera, the image of a video reproducing apparatus, which is produced by means of the video output signal of the video camera, greatly flickers.

A case which is of importance in practice and in which such problems arise, results from the use of the video camera for generating a monitor signal or for producing a video tape used for future film cutting work in a motion-picture mirror-reflux film camera. In such a case, the video camera is arranged in an optical viewfinder path of the motion-picture mirror-reflex film camera, either to make possible the evaluation of the momentarily recorded image on one or a plurality of monitors to persons other than the cameraman, or, for the purpose of supporting future film cutting work, to produce a video recording which is parallel to the filmed scene on a video tape on which, if necessary, additional data are reported for the film cut. In this case, the periodic presence and absence of a light supply from the object to be recorded to the video camera is due to the fact that a movable mirror diaphragm, provided in the optical path of the motion-picture mirror-reflex film camera, periodically opens and diverts, respectively, the light path from the object to be recorded in an alternate manner towards the film to be exposed and towards the video camera arranged in the optical viewfinder path.

SUMMARY OF THE INVENTION

An object of the subject invention is to provide a control circuit for a video camera, in which, when periodically varying or interrupted light is supplied from an object, a video output signal therefrom produces a non-flickering video image. This object is achieved in a control circuit for a video camera, characterized in that the control circuit includes a signal source having an output signal which represents the presence and absence of a light supply from the object to the video camera, the control circuit being coupled to an output of the video camera whereby the supply of the output signal of the signal source thereto prevents the reading out of a charge image at least during a period when the output signal represents the presence of the light supply.

A further object of the invention is to provide a method for controlling a video camera, so that a non-flickering video image is produced even if there is a varying or periodically interrupted light supply from the object to the video camera. This object is achieved in a method for controlling a video camera, which method includes producing a charge image of an object to be recorded, and producing a video output signal by reading out the charge image, characterized in that the method further includes detecting the periodic presence or absence of the light supply from the object, and preventing the reading out of the charge image at least during the presence of the light supply from the object.

The invention is based on the recognition that in the case of the above-described arrangement of the known video camera within a motion-picture mirror-reflex film camera, image flicker of the video image producable by means of the video output signal of the video camera is not only caused by the fact that the mirror diaphragm periodically interrupts the light path to the video camera so that image spots of the charge image which are recorded during corresponding times are black, but is also due to the fact that the time operative for charging an image spot of the charge image between the last erasing read-out and the next erasing read-out of the charge image is shortened by periods which vary from frame to frame and during which the light path to the video camera is interrupted. In other words, the respective length of time of effective exposure for an image element of the charge image between an erasing read-out of the charge image for generating a video output signal and the next erasing read-out of the charge image for generating the next video output signal differs from frame to frame because the usual frame frequency of a motion-picture mirror-reflex film camera does not coincide with the field frequency of a video camera. For instance, the frame frequency of a motion-picture mirror-reflex film camera is usually 24 frames per second while the field frequency of a conventional video camera is 60 fields per second.

According to the invention, the image flicker is eliminated by preventing the read-out of the charge image for generating the video output signal during the supply of light to the video camera so that a read-out of the charge is also only possible when the light supply to the video camera is interrupted. This has the effect that the time of exposure decisive for the brightness of the image spot remains constant from video field to video field. In other words, the time for reading out the charge image for generating the video output signal is preferably controlled such that the effective time of exposure for each image spot corresponds to the full length of time of the periodic light supply to the video camera.

As to the effective time of exposure of an individual image spot, it is of no importance at which moment during the period of the interrupted light supply the charge image is read out because the charge potential of the image spot remains constant during the period of interrupted light supply.

Consequently, the control circuit of the invention for a video camera, as well as the process of the invention for controlling the video camera, ensure a non-flicker video image irrespective of the frame frequency of the motion-picture mirror-reflex film camera.

When the video camera is used within the motion-picture mirror-reflex film camera, the period of the light supply from the object to be recorded to the video camera is usually longer than the length of time which, when the usual video clock is taken as a basis, is available for building up the charge image between two instants of erasing readout. In the above-described example, this period, being 1/48 sec. is about 25% above the corresponding video-clock length of time of 1/60 sec. As desired, this results in a distinctly stronger exposure of the image converter of the video camera.

The provision of the control circuit of the invention, in which an image storing means is connected to the video camera, and the control circuit supplies a take-over signal to a control input thereof for taking over the charge image by storing the video output signal when the output signal of the signal source represent the absence of the light supply, makes possible a reading out of the image storing means in the usual video clock regardless of the field frequency of the video camera which is now influenced by the mode of operation of the motion-picture mirror-reflex film camera. Due to the fact that the take-over signal for taking over the charge image from the video camera to the image storing means is only generated in the absence of the light supply to the video camera, the charge means is only taken over into the image-storing means during its static state. On its output side, the image storing means can be scanned at a frequency which is independent of the field frequency of the video camera. Adaption to the respectively desired television standard is thereby made possible.

The provision of the control circuit of the invention, in which the storing capacity of the image storing means corresponds to a field or a frame and that the image storing means interrupts the storing of the video output signal of the video signal, which is triggered by the take-over signal, as soon as a complete field or frame has been stored, and resumes storing as soon as the take-over signal has been re-supplied, ensures an efficient storing because a field can only then be taken over from the video camera into the image storing means when the field has a new image contents. Moreover, it is thereby avoided that after an erasing taking over of a field into the image storing means a further field take-over which would result in an indesired erasing of the image storage contents takes place in a faulty manner.

The respective presence and absence of a light supply to the video camera can be determined in a simple manner by using a photoelectric element as the signal source.

Reliable information on the presence or absence of a light supply from the object to be recorded to the video camera can be obtained by scanning the position of the mirror diaphragm of the mirror-reflex camera in the case of the already described use of the video camera within a mirror-reflex camera.

The derivation of the take-over signal for the image-storing means from the signal preventing the reading out of the charge image by signal inversion can be realized in a very simple manner from a circuitry point of view.

A further increase in the image quality is attained by the provision of the control circuit according to the invention, in which the output signal generated by the signal source is supplied to a monostable multivibrator which is provided in the control circuit and which, when the output signal occurs, generates a pulse having a duration exceeding the length of time between two horizontal pulses of the horizontal synchronization signal of the video camera, and in which the output signal of the multivibrator is connected to the horizontal synchronization signal of the camera, by an AND gate to form a vertical reset signal, the AND gate also receiving a color carrier signal of the video camera for logic interconnection with the output of the multivibrator and the horizontal synchronization signal for forming the vertical reset pulse. It turns out that a reading out of the charge image for generating the video output signal when the signal preventing the reading out no longer occurs, i.e. at any spot within the charge image in accordance with the instantaneous moment within the video clock, leads to horizontal fringes in the video image produced. By means of the vertical reset of the time control for the video camera in synchronization with the horizontal synchronization signal of the video camera and the output signal of the signal source it is attained that the reading out of each charge image starts at the first image spot thereof. Moreover, the charge image is preferably read out in synchronization with the color carrier signal to accomplish a respectively constant phase of the color carrier in the successive fields.

A simple circuitry realization of the indicated synchronization is attained by the control circuit when the take-over signal and the signal for preventing the reading out of the charge image are derived from the vertical reset pulse.

The control circuit for the video camera, in which the image storing means is subdivided into partial areas into which fields are adapted to be stored and from which the fields are adapted to be read out, wherein the image signal inputs of each partial area of the image storiing means are adapted to be connected to the video signal output of the video camera by a first change-over switch, the image signal output of each partial area are connected to a joint image storage output by a second change-over switch, and the control circuit triggers the change-over switches such that the partial areas momentarily connected to the video output on the input side thereof is disconnected from the joint image storage output, makes possible a refreshing of the image storage contents irrespective of its read-out so that a renewal of the storage contents never leads to a disturbance of the image signal respectively read out.

After a field has been stored, the partial areas of the image storing means are expediently switched over when the control circuit actuates the change-over switches whenever the preventing signal occurs.

A reading out of the respective field storage contents without the need for taking into account an ordinal or phase position of the color carrier of the field is made possible by the video camera generating a color carrier signal, the phase of which is invariable with respect to one of the horizontal and vertical synchronization signals, and at the second change-over switch, the joint image storage output being connected to a color preparation circuit which switches over the phase of the color carrier signal under the control of the control circuit, in accordance with a color signal phase sequence for fields of a desired television standard. Hence, it is possible with the help of the development of the control circuit described above to read out fields from a partial area several times in succession according to the frequency of the image storage read-out on the output side in relation to the frequency of the storing of fields. In the color preparation circuit connected to the image storage output, the phase of the color carrier signal which is constant from field to field is adapted to the respective television standard by changing the phase.

An analog-to-digital converter, which converts the video output signal into the digital form without a preceding division of said signal according to luminance and chrominance portions, is preferably arranged before the image storing means.

A further increase in the image quality is attained by provision of the control circuit, in which illumination means are provided for producing a basic illumination of an image converter of the video camera for setting a working point of the image converter, and the control circuit is connected to the illumination means and switches off the illumination means at least during the period in which the output signal of the signal source represents the absence of the light supply, using the signal for preventing the reading out of the charge image, the illumination means being disconnectable in a manner unlimited in time. The illumination means used for setting the working point of the image converter is switched off at least during the period of the absence of the light suply to the video camera. Hence, it is thereby attained that the charge image remains completely constant during the respective period of the absence of the light supply to the video camera. It is thus possible to read out the charge image at any moment during the absence of the light supply. This is in particular of importance whenever for reasons of synchronizing the reading out of the charge image for generating the video output signal with the horizontal synchronization pulse of the video camera, it is necessary to perform the read-out process with different lengths of time with respect to the moment of the absence of the light supply to the video camera.

If the setting of an optimum working point of the image converter can be dispensed with, this can be attained in an extremely simple way by switching the illumination means off in a manner which is unlimited in time.

BRIEF DESCRIPTION OF THE DRAWINGS

Preferred embodiments of the present invention are hereinafter explained in detail with reference to the attached drawings, in which.

DESCRIPTION OF THE PREFERRED EMBODIMENTS

Figure 1:
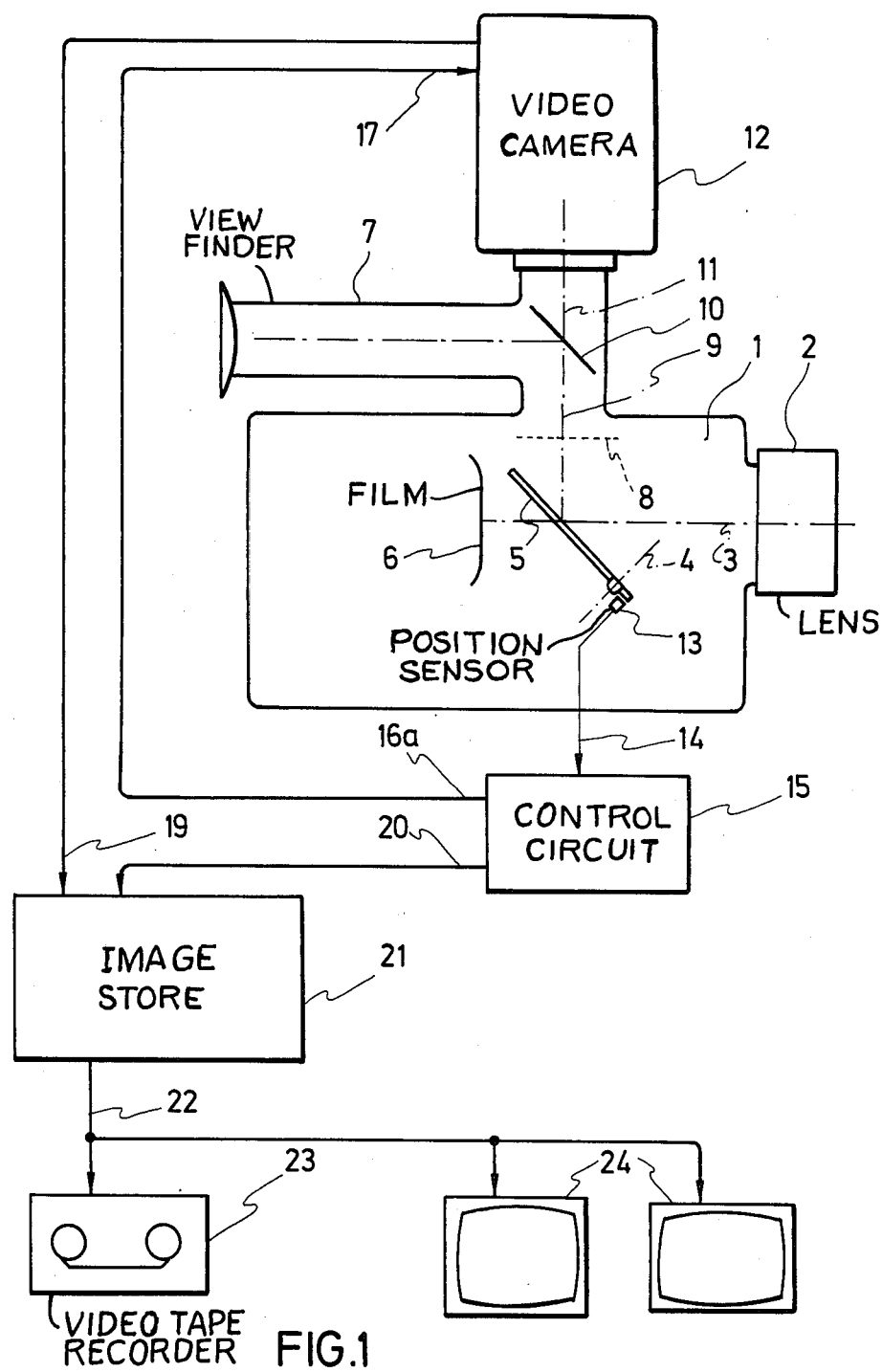
FIG. 1 is a first embodiment of a control circuit of the invention comprising a video camera arranged in an optical path of a motion-picture reflex camera.

In FIG. 1, a motion-picture mirror-reflex film camera, which is per se known in the prior art, has a lens 2 through which an optical path 3 extends from the object to be recorded into the camera. The light in the optical path 3 is alternately passed, by a mirror diaphragm 5 rotating about an axis 4, to a film 6 to be exposed, and deviated into an optical viewfinder path. A part of the radiation entering the optical viewfinder path is deviated by a semireflecting mirror surface 10 to a viewfinder 7 whereas the remaining radiation 11 is passed to a video camera 12. In a plane 8, there is an image of the object to be recorded which is produced by the lens 2 via the mirror diaphragm 5. The optical components for transferring this image which is present in the plane 8 to the ocular of the viewfinder 7 are known in the prior art and therefore need not be described in further detail. Nor is it necessary to describe the mode of operation and the details of the film camera 1 which is per se known in the prior art.

The video camera 12 is constructed in the usual form known in the prior art. It comprises a vidicon image tube as an image converter wherein the incident light is converted into a charge image which can be read out line by line. The video camera can also have as an image converter element, a so-called "solid state imager" which converts the incident radiation into a charge image.

The position of the mirror diaphragm 5 is detected by a position sensor 13, which forms a signal source, the output signal 14 of which is supplied to a control circuit 15. The control circuit 15 is in communication with a control input 17 of the video camera 12. Moreover, the control circuit 15 is connected to a control input of an image storing means 21 by means of which a video output signal of the video camera 12 can be stored. On the output side, the image storing means (21) is in communication with a video-tape recording apparatus 23 as well as two monitors 24.

Figure 3:
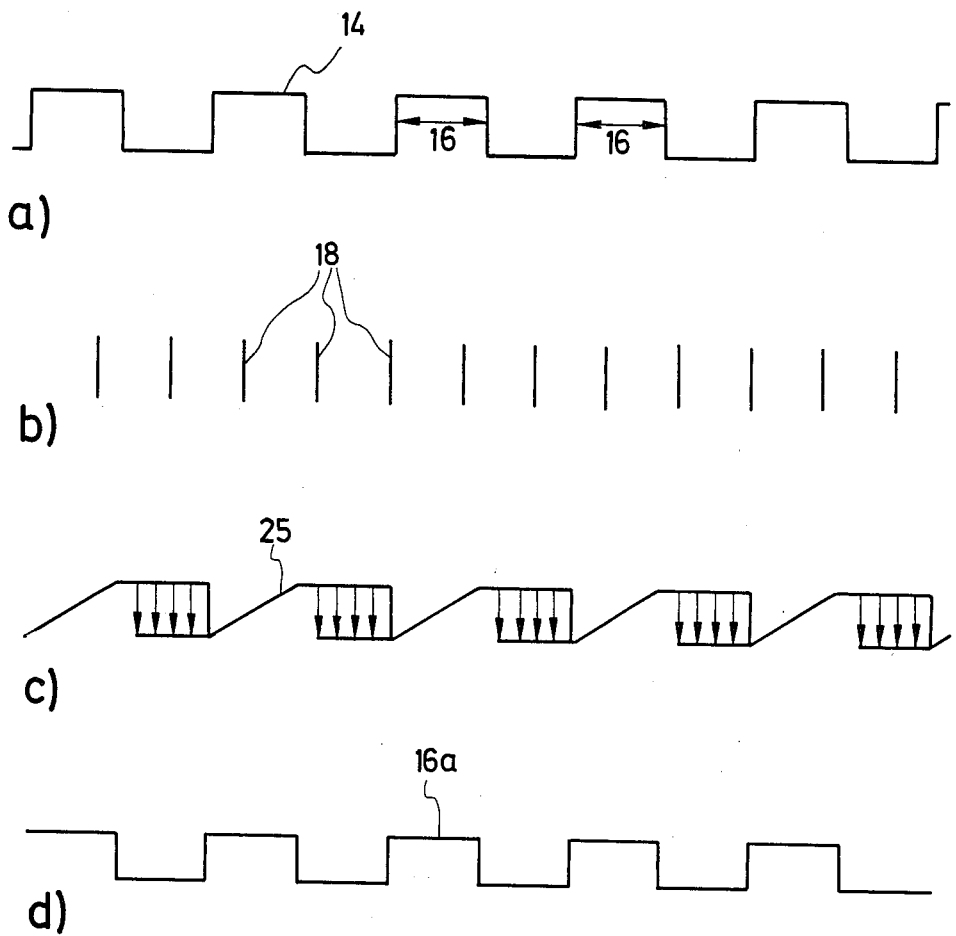
FIG. 3 is a time representation of the signal for explaining how the control circuit of the invention functions.

The mode of operation of the control means shown in FIG. 1 is hereinafter explained in detail with reference to the time courses of the signals shown in FIG. 3. The position sensor 13 produces a pulse chain having a pulse frequency which corresponds to the frequency of rotation of the mirror diaphragm 5. The control circuit 15 forms from the output signal of the position sensor 13, a signal 16a (FIG. 3d) which has, respectively, a high logic potential during the periods of time 16 (FIG. 3a) in which the optical path 3 is deviated from the mirror diaphragm 5 to the video camera 12. The signal 16a, which is applied to the control input 17 of the video camera 12, produces a blocking potential at a control grid of the vidicon tube (not shown) which prevents reading out of the charge image. The erasing reading out of the charge image for generating the video output signal during the light supply to the video camera 12 is thereby interrupted.

FIG. 3b shows a pulse chain 18 which represents the video clock of the video camera 12. The video clock signal 18 represents the respective initial moments of the reading out of a charge field when there is no blocking signal 16a. A pulse of the video clock signal 18 which occurs during the period of the presence of the signal 16a preventing the reading out of the charge image, however does not result in a reading out of the charge image.

FIG. 3c shows the charge course of an image spot of the charge image of the vidicon tube. During the light supply from the object to the video camera, the charge continuously increases, while after the interruption of the light supply, the charge remains constant. Irrespective of the selected read-out moment, represented by the downwardly directed arrow, the video output signal remains constant within the period of the absence of a light supply to the video camera.

The image storing means 21, the constructional form of which is per se known in the prior art, has the capacity of a field or a frame. After a field or a frame has been taken over by from the video camera 12 under the control of the take-over signal 20, the image storing means 21 interrupts the storing of the video output signal. The next frame or field is not taken over from the video camera until renewed generation of the take-over signal. The take-over signal 20 for the image storing means 21 can be generated by inverting the signal 16a preventing the reading out of the charge image.

On the output side, the image storing means 21 can be read out at a frequency which corresponds to the field frequency of a desired television standard. Thus, an uncoupling of the take-over of the charge images from the video camera 12 to the image storing means according to frequency and of the reading out of the image storage means 21 at its output 22 is made possible by the image storing means 21.

The video signal which is present at the output 22 of the image storing means 21 is supplied to the video-tape recording apparatus 23 and the monitors 24.

Figure 2:
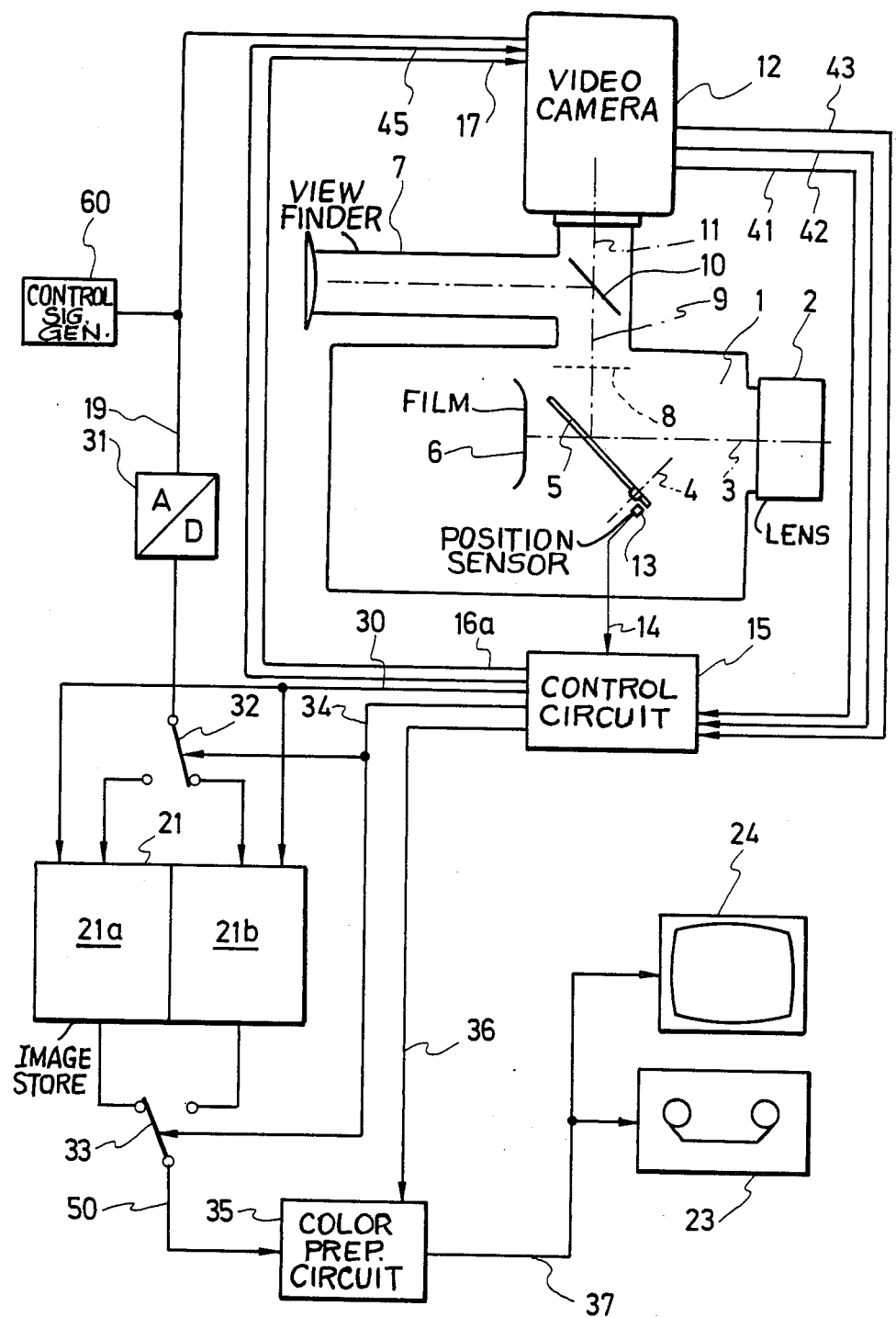
FIG. 2 is a modified embodiment of the control circuit of the invention for a video camera arranged in an optical path of a motion-picture reflex camera.

A further improved embodiment which is modified with respect to the embodiment shown in FIG. 1 and relates to a control circuit for a video camera is shown in FIG. 2. Identical parts of the embodiments shown in FIGS. 1 and 2 are marked with the same reference numbers so that a repeated description of these parts can be omitted.

The video camera 12 is connected to three inputs of the control circuit 15' via 3 lines. The video camera 12 supplies a horizontal synchronization signal 41, a color carrier signal 42 and a vertical synchronization signal 43 to the control circuit 15' via these lines. In addition to the signal 16a preventing the read-out of the charge image, the control circuit 15' supplies a vertical reset signal 45 to the video camera.

The video camera 12 supplies the video output signal to an analog-to-digital converter 13 which converts the video output signal in its complete form, i.e. without subdivision in accordance with luminance signals and chrominance signals, into digital form. The analog-to-digital converter 31 also converts output signals of a time and control signal generator 60 which, on the one hand, applies optical time and, control markers to the film 6 and on the other hand, superimposes the video output signal of the video camera 12 with corresponding time and control markers so that in case of a future film cutting, a simple assignment of a video tape section to a specific film frame is possible.

The output signal of the analogue-to-digital converter 31 is supplied to a first change-over switch 32 which is connected to two partial areas 21a, 21b of the image storing means 21 wherein a field is respectively adapted to be stored. The partial areas 21a, 21b of the image storing means 21 are connected through a second change-over switch 33 on the output side, to a joint image storage output 50. The first change-over switch 32 and the second change-over switch 33 are triggered by the control circuit 15' via a control signal line 34 such that during each read-out of a field from the video camera there is a switch-over and that the partial area 21, 21b of the image storing means 21 momentarily connected to the video output 19 on the input side is disconnected from the joint image storage output 50 on the output side. Thus, the video output signal can only be stored into that partial area 21b from which a field cannot be read out at that moment, whereas a field can only be read out from such a partial area 21a into which a field cannot be stored at that moment.

The video camera 12 functions such that the color carrier phase of subsequent fields read out therefrom remains constant. A color preparation circuit 35, connected to the output 50 of the image storing means 21a, 21b, takes up a phase angle rotation of the color carrier signal at every second field read-out in accordance with the respectively desired television standard. The color carrier phase is usually rotated by about 180° when every second field is read out.

Figure 4:
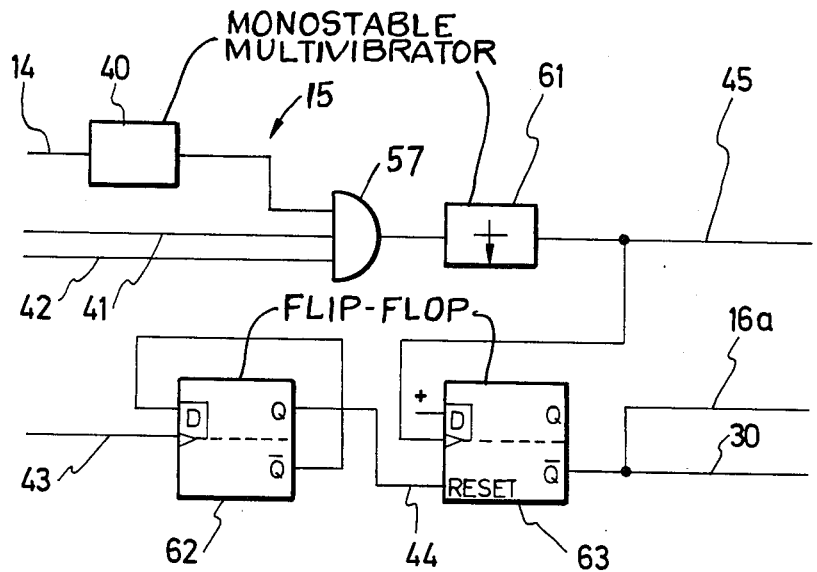
FIG. 4 is a detailed wiring diagram of an essential part of the control circuit of FIG. 2.

As far as the generation of the vertical reset signal for the video camera 12 and the control of the image storing means 21 by means of a storage control signal 30 is concerned, the following explanation of the circuit according to FIG. 4 is referred to.

Figure 5:
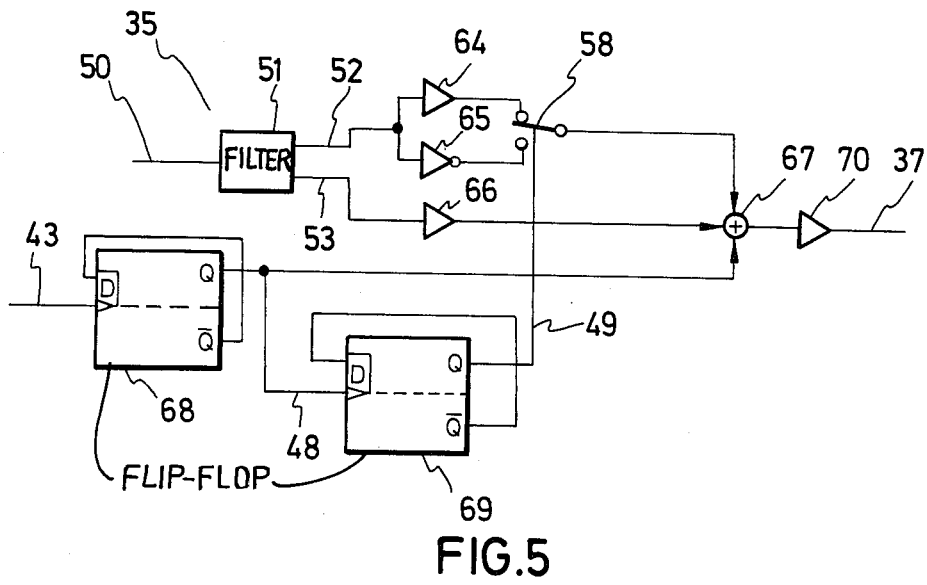
FIG. 5 is a wiring diagram of a color preparation circuit.

As to the mode of operation of the color preparation circuit 35, FIG. 5 is referred to.

Figure 6:
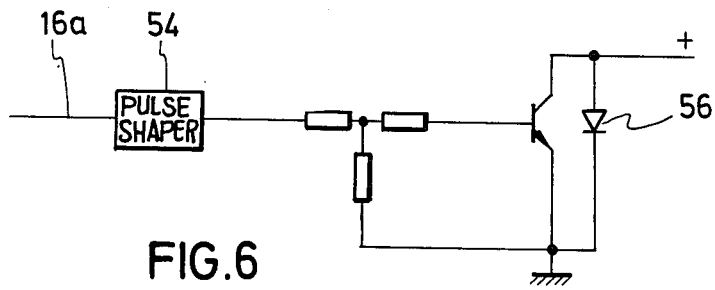
FIG. 6 is a wiring diagram of a control circuit for controlling a basic illumination of an image converter of the video camera.

As long as the light supply to the video camera is interrupted, the control circuit 15' effects a switching off of the basic illumination of the video camera 12. With reference to FIG. 6, the corresponding mode of operation of the control circuit 15' is explained.

FIG. 4 shows an essential part of the control circuit 15' shown in FIG. 2, which controls the generation of the vertical reset signal for the video camera 12 and controls the image storing means 21, by means of the storage control signal 30. This part of the control circuit 15 contains a monostable multivibrator 40 which forms an output pulse from the pulse-like output signal 14 generated by the position sensor 13 with the pulse duration of this output pulse being longer than the length of time between two pulses of the horizontal synchronization signal 41 of the video camera 12. The output signal of the monostable multivibrator 40 is supplied to a first input of an AND gate 57 to which the horizontal synchronization signal 41 and the color carrier 42 are additionally supplied. A vertical reset pulse, the duration of which is determined by a further monostable multivibrator 61, is thus derived from the output of the AND gate 57 by combining said three signals. Said vertical reset pulse 45 serves for resetting the video clock to obtain a reading out of the charge image starting with the first image spot.

The vertical synchronization signal 43 of the video camera 12 is halved according to frequency by means of a D flip-flop 62 and supplied to a reset input 44 of a second D flip-flop 63. The vertical reset signal 45 is supplied to the input clock of the second flip-flop 63. The signal 16a for preventing the reading out of the charge image as well as a further signal 30, by means of which an address control of the storing means 21 is reset are produced from the inverted output of the second flip-flop 63. It is thereby ensured that the charge image of the video camera 12, which is read out starting with the first image spot of the field, is stored in the partial area 21, 21b in a corresponding sequence.

With reference to FIG. 5, the color preparation circuit 35 shown in FIG. 2 is hereinafter explained in detail. The color preparation circuit 35 consists of a filter circuit 51 to which the output signal 50 of the image storing means 21 is supplied. The filter circuit 51, which is per se known in the prior art, divides the output signal into the chrominance signal 52 and the luminance signal 53. The chrominance signal 52 is applied to a first pole of a change-over switch 58 via an amplifier 64. In addition, the chrominance signal 52 is supplied to an inverter 65 which on the output side is connected to a second pole of the change-over switch 58. The luminance signal 53 is amplified by means of an amplifier 66 and supplied to a junction point 67 to which the output of the change-over switch 58 is also connected.

The vertical synchronization signal 43 of the video camera 12 is divided into an output signal 48 having half frequency via a D flip-flop 68. This output signal 48 is again divided according to frequency by means of a further D flip-flop 69. The inverted output of the flip-flop 69 controls the change-over switch 58 for the chrominance signal 52. The output signal of the change-over switch 58 is supplied to the junction point 67 together with the amplified luminance signal 53 and the output signal of the flip-flop 68. The potential of the junction point is increased via an amplifier 70 arranged after the junction point, and is used as a video signal for triggering the tape-recording apparatus 23 arranged thereafter and the monitor 24, respectively, arranged thereafter (FIG. 2).

FIG. 6 shows a trigger circuit for switching on and off an illumination means 56 which serves for generating a basic illumination of the image converter, which is inside the camera, for setting the working point of the image converter. The illumination means is provided as a light-emitting diode 56 in usual video cameras 12 operating with vidicon tubes. Via a pulse shaper 54, the signal 16a, preventing the reading out of the charge image, is applied to a transistor circuit which is parallel to the light-emitting diode 56. The light-emitting diode 56 is thus switched off while the signal 16a preventing the reading out of the charge image is present.

Contrary to the wiring shown in FIG. 6, the illumination means 56 can be directly controlled by means of the output signal of the position sensor 13. Care must only be taken that the illumination means 56 is switched off at least during the time during which the light supply to the video camera 12 is interrupted.

If an optimization of the working point of the image converter is not necessary, the basic illumination of the image converter can also be switched off in a manner unlimited in time. In this case, too, the illumination means is prevented from producing a change in the charge condition of the charge image during the period of time of the interruption of the light supply to the video camera. As a result of the constant nature of the charge level thus attained during the period of the interruption of the light supply to the video camera, the charge image can be read out at any time within this period, i.e. preferably in synchronization with the horizontal synchronization pulse of the video camera 12 and the signal of the position sensor 13 as well as the color carrier signal.

Although the control circuit of the invention is preferably used where a video camera is arranged in an optical path of a motion-picture reflex camera which is periodically interrupted by a movable mirror diaphragm, the control circuit of the invention can also be used everywhere there is a periodically interrupted light supply to the video camera or where an object illuminated with a greatly varying brightness is to be recorded by means of a video camera.

We claim:

1. A control system for a video camera for producing a charge image of an object to be recorded, which image is at least partially erased when being read-out for generating a video output signal of the video camera, comprising:
   a control circuit having a signal source for generating a signal representing presence and absence of a supply of light from the object to be recorded to the video camera, said control circuit being connected to an input of the video camera for supplying a signal thereto preventing the reading-out of the charge image at least during a period in which the output signal of the signal source represents the presence of light supply;
   said control system further comprising an electronic image storing means to which said control circuit is connected, wherein said control circuit supplies a take-over signal to a control imput of the image storing means for taking over the charge image by storing the video output signal when the output signal of said signal source represents the absence of the light supply, characterized in that said signal source is a photoelectric element arranged in an optical path of the video camera.

2. A control system for a video camera for producing a charge image of an object to be recorded, which image is at least partially erased when being read-out for generating a video output signal of the video camera, comprising:
   a control circuit having a signal source for generating a signal representing presence and absence of a supply of light from the object to be recorded to the video camera, said control circuit being connected to an input of the video camera for supplying a signal thereto preventing the reading-out of the charge image at least during a period in which the output signal of the signal source represents the presence of light supply;
   said control system further comprising an electronic image storing means to which said control circuit is connected, wherein said control circuit supplies a take-over signal to a control input of the image storing means for taking over the charge image by storing the video output signal when the output signal of said signal source represents the absence of the light supply, wherein the video camera is arranged in an optical path of a motion-picture reflex camera, said optical path being directed by a movable mirror diaphragm to a film to be exposed and to the video camera in a periodically alternating manner so that the light supply to said video camera is periodically interrupted, characterized in that said signal source is a position sensor, the output signal of which represents the position of said mirror diaphragm.

3. A control system for a video camera for producing a charge image of an object to be recorded, which image is at least partially erased when being read-out for generating a video output signal of the video camera, comprising:
a control circuit having a signal source for generating a signal representing presence and absence of a supply of light from the object to be recorded to the video camera, said control circuit being connected to an input of the video camera for supplying a signal thereto preventing the reading-out of the charge image at least during a period in which the output signal of the signal source represents the presence of light supply;
said control system further comprising an electronic image storing means to which said control circuit is connected, wherein said control circuit supplies a take-over signal to a control input of the image storing means for taking over the charge image by storing the video output signal when the output signal of said signal source represents the absence of the light supply, characterized in that said take-over signal for said image-storing means is an inverted version of said signal preventing the reading out of the charge image.

4. A control system for a video camera for producing a charge image of an object to be recorded, which image is at least partially erased when being read-out for generating a video output signal of the video camera, comprising:
a control circuit having a signal source for generating a signal representing presence and absence of a supply of light from the object to be recorded to the video camera, said control circuit being connected to an input of the video camera for supplying a signal thereto preventing the reading-out of the charge image at least during a period in which the output signal of the signal source represents the presence of light supply;
said control system further comprising an electronic image storing means to which said control circuit is connected, wherein said control circuit supplies a take-over signal to a control input of the image storing means for taking over the charge image by storing the video output signal when the output signal of said signal source represents the absence of the light supply, characterized in that the output signal generated by said signal source is supplied to a monostable multivibrator which is provided in said control circuit and which, when the output signal occurs, generates a pulse having a pulse duration exceeding the time interval between two horizontal pulses of a horizontal synchronization signal of the video camera, and the output signal of said multivibrator is combined with the horizontal synchronization signal of the video camera via an AND gate to form a vertical reset signal for the video camera.

5. A video camera according to claim 4, characterized in that a color signal of the video camera is also supplied to said AND gate for logic interconnection with the output signal of said monostable multivibrator and the horizontal synchronization signal for forming said vertical reset pulse.

6. A video camera according to claim 4, characterized in that said take-over signal and said signal preventing the reading out of said charge image, are derived from the output signal of said AND gate.

7. A control system for a video camera for producing a charge image of an object to be recorded, which image is at least partially erased when being read-out for generating a video output signal of the video camera, comprising:
a control circuit having a signal source for generating a signal representing presence and absence of a supply of light from the object to be recorded to the video camera, said control circuit being connected to an input of the video camera for supplying a signal thereto preventing the reading-out of the charge image at least during a period in which the output signal of the signal source represents the presence of light supply;
said control system further comprising an electronic image storing means to which said control circuit is connected, wherein said control circuit supplies a take-over signal to a control input of the image storing means for taking over the charge image by storing the video output signal when the output signal of said signal source represents the absence of the light supply, characterized in that said image storing means is subdivided into partial areas into which fields are adapted to be stored and from which said fields are adapted to be read out, image signal inputs of each partial area of said image storing means being adapted to be connected to the video output of said video camera via a first change-over switch, and image signal outputs of each partial area of said image storing means being adapted to be connected to a joint image storage output via a second change-over switch, and that said control circuit triggers said change-over switches such that the partial area of said image-storing means momentarily connected to the video output on the input side thereof is disconnected from said joint image storage output on the output side.

8. A video camera according to claim 7, characterized in that said control circuit actuates said change-over switches whenever said signal preventing the reading out of the charge image occurs.

9. A video camera according to claim 7, characterized in that the video camera generates a color carrier signal having a phase which is invariable with respect to the one of the horizontal and vertical synchronization signals, and at the second change-over signal switch, said joint image storage output is connected to a color preparation circuit which switches over the phase of said color carrier signal under the control of the control circuit in accordance with a color-signal phase sequence for fields of a desired color television standard.

10. A control system for a video camera for producing a charge image of an object to be recorded, which image is at least partially erased when being read-out for generating a video output signal of the video camera, comprising:
a control circuit having a signal source for generating a signal representing presence and absence of a supply of light from the object to be recorded to the video camera, said control circuit being connected to an input of the video camera for supplying a signal thereto preventing the reading-out of the charge image at least during a period in which the output signal of the signal source represents the presence of light supply;

said control system further comprising an electronic image storing means to which said control circuit is connected, wherein said control circuit supplies a take-over signal to a control input of the image storing means for taking over the charge image by storing the video output signal when the output signal of said signal source represents the absence of the light supply, characterized in that an analog-to-digital converter is arranged between the video signal output of said video camera and the input of said image storing means.

11. A control system for a video camera for producing a charge image of an object to be recorded, which image is at least partially erased when being read-out for generating a video output signal of the video camera, comprising:

a control circuit having a signal source for generating a signal representing presence and absence of a supply of light from the object to be recorded to the video camera, said control circuit being connected to an input of the video camera for supplying a signal thereto preventing the reading-out of the charge image at least during a period in which the output signal of the signal source represents the presence of light supply;

said control system further comprising an electronic image storing means to which said control circuit is connected, wherein said control circuit supplies a take-over signal to a control input of the image storing means for taking over the charge image by storing the video output signal when the output signal of said signal source represents the absence of the light supply, further comprising an illumination means producing a basic illumination of an image converter of the video camera for setting a working point of said image converter, characterized in that control circuit is connected to said illumination means, and switches off said illumination means at least during a period in which the output signal of the signal source represents the absence of the light supply.

12. A video camera according to claim 11, characterized in that control circuit switches off said illumination means by means of said signal preventing the reading out of the charge image.

13. A control system for a video camera for producing a charge image of an object to be recorded, which image is at least partially erased when being read-out for generating a video output signal of the video camera, comprising:

a control circuit having a signal source for generating a signal representing presence and absence of a supply of light from the object to be recorded to the video camera, said control circuit being connected to an input of the video camera for supplying a signal thereto preventing the reading-out of the charge image at least during a period in which the output signal of the signal source represents the presence of light supply;

said control system further comprising an electronic image storing means to which said control circuit is connected, wherein said control circuit supplies a take-over signal to a control input of the image storing means for taking over the charge image by storing the video output signal when the output signal of said signal source represents the absence of the light supply, comprising an illumination means for producing a basic illumination of an image converter of the video camera for setting a working point of said image converter, characterized in that illumination means is switched off during operation of said video camera when controlled by said control circuit.

* * * * *